May 23, 1961 — B. H. LEONARD, JR — 2,985,264
FORM SUPPORTING GIRDER
Filed Oct. 19, 1954 — 2 Sheets-Sheet 1
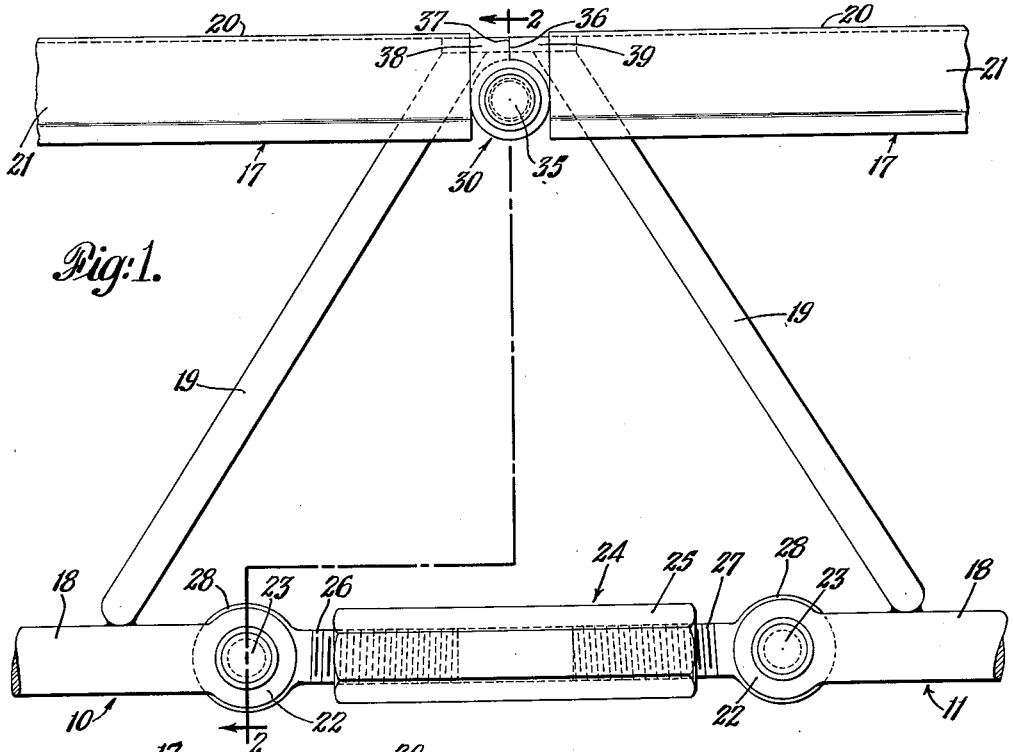
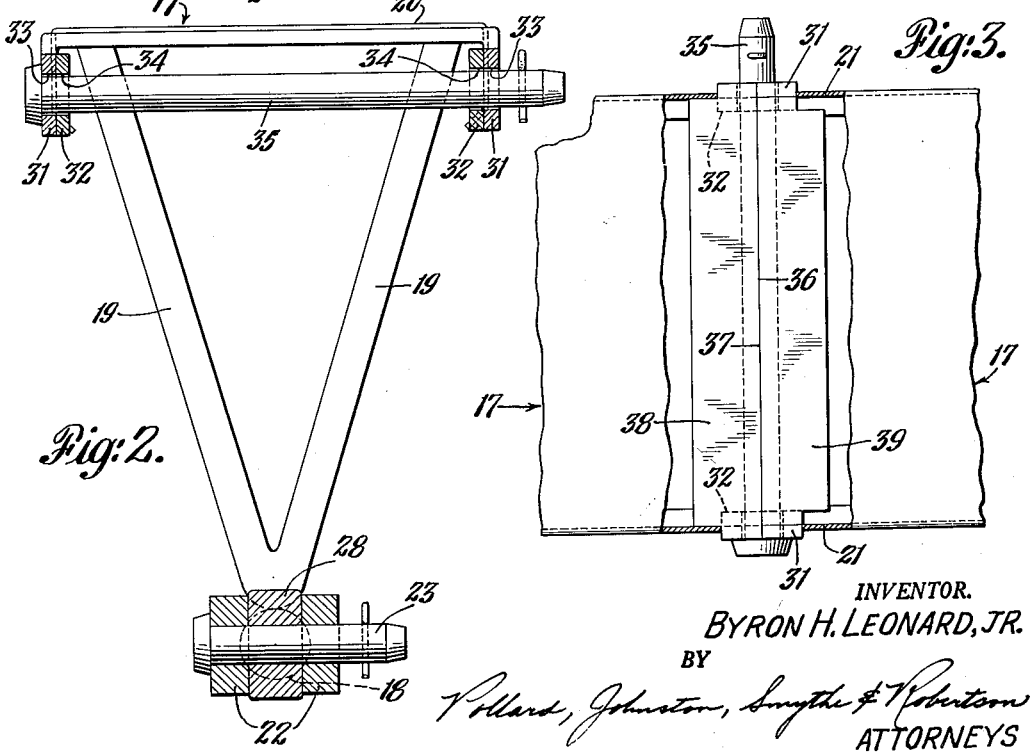
INVENTOR.
BYRON H. LEONARD, JR.
BY
ATTORNEYS May 23, 1961 B. H. LEONARD, JR 2,985,264
FORM SUPPORTING GIRDER
Filed Oct. 19, 1954 2 Sheets-Sheet 2
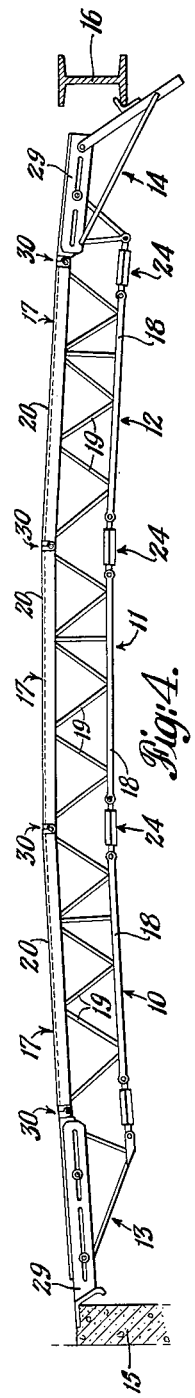
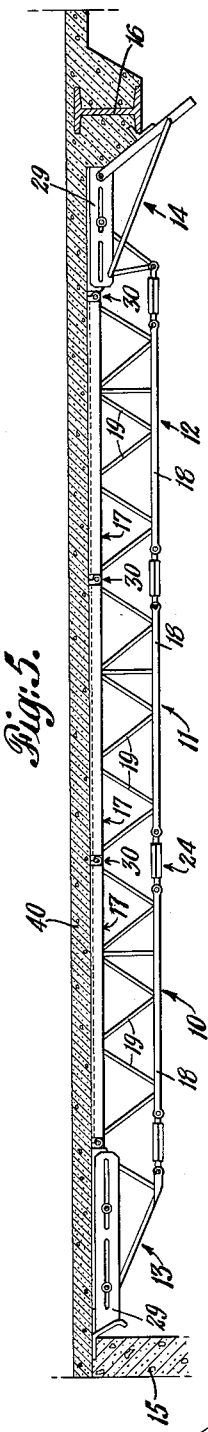
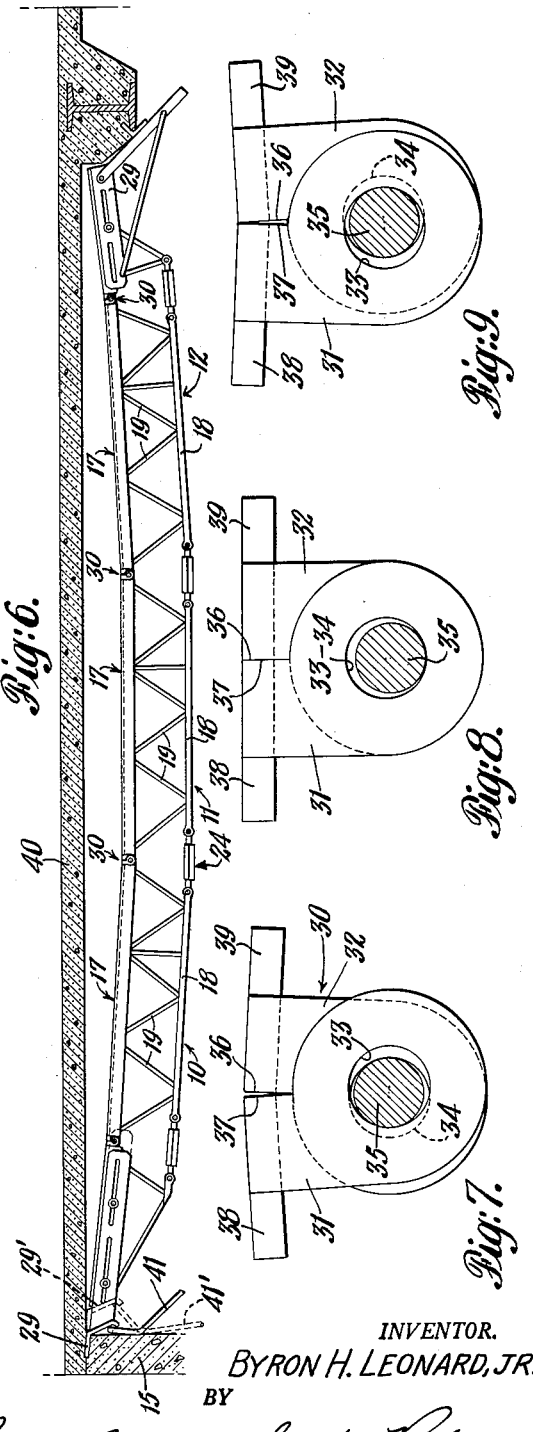
INVENTOR.
BYRON H. LEONARD, JR.
BY
ATTORNEYS

United States Patent Office 2,985,264
Patented May 23, 1961

2,985,264
FORM SUPPORTING GIRDER

Byron H. Leonard, Jr., Clayton, Mo., assignor, by mesne assignments, to Julius G. Forstmann, Greenwich, Conn., and Thomas L. Perkins, Rye, N.Y.

Filed Oct. 19, 1954, Ser. No. 463,268

2 Claims. (Cl. 189—37)

The invention relates to form supporting girders for use in the construction of reinforced concrete and precast concrete block floors, ceilings and arches, and for analogous purposes. It relates more particularly to form supporting girders of the sectional type described and claimed in the Hinze U.S. Patent No. 2,687,193, and especially to improvements in the means for connecting together the sections of such girders.

Summary

Heretofore, the means in general use both in the United States and in Europe for connecting the Hinze-type girder sections together at their upper chords has comprised clamps surrounding vertical transverse flanges at the adjacent ends of the upper chord members, or bolts extending through such flanges. Such means are shown at 9 in Fig. 9 of the Hinze patent aforesaid. The trouble with such clamps and bolts is that their use entails considerable time and labor, making it expensive and inconvenient to assemble and disassemble the girder in the factory or on the building site. Moreover, it is a bother to handle so many small fastenings which are easily lost. It is an object of my invention to provide an improved connection which will overcome these problems without sacrificing any of the basic advantages of the butt-jointed, camberable, and infinitely adjustable construction of the Hinze-type girder.

I have discovered a way of combining a shear-type pin connection with a butted joint which will permit utilization of the simple shear-type pin connection for holding the girder sections together for handling purposes during delivery, carrying, hoisting, placement, adjustment of camber, etc., and which also affords a means of reducing or eliminating shear loading of the connecting pin and utilizing the full strength characteristics of the butted joint when the girder is in use under load. I have discovered further that the latter result can be made to occur automatically between an unloaded pre-cambered condition of the girder and a loaded no-camber condition, without any special attention on the part of the workman. The effect of the transfer from shear loading to butt loading is strikingly demonstrated by the fact that in the first-named condition the connecting pin is tightly held under the shear load, whereas in the last-named condition the pin becomes so loose that it can under most circumstances be removed easily with the fingers.

My improved connecting means has special application to a sectional form supporting girder comprising sections joined end to end to form a continuous load sustaining structure adapted to span the distance between a pair of spaced supports, and in which such sections have connecting means (such as a turnbuckle connection) spaced from the upper load supporting surfaces thereof. In accordance with the present invention other connecting means are provided between an adjacent pair of such sections, this other connecting means being constructed and arranged as follows: The mating ends of the adjacent pair of sections are formed with overlapping portions adjacent the upper load supporting surfaces, and these overlapping portions have aligned openings to receive a connecting pin extending transversely to the length of the girder. Further, the mating ends are formed with transversely extending surfaces abutting for transmission of compressive stresses between the adjacent girder sections, and the aforesaid aligned openings and abutting surfaces are disposed in a relation such that when the girder is under load the connecting pin is substantially free from shear loading. What happens is that the transversely extending surfaces of the mating ends of the respective sections come into abutting relationship when the girder is fully loaded, and for these conditions the openings for the connecting pin are brought substantially into alignment so that the pin is fairly loose. Thus the pin connection is indexed to the abutting surfaces so that when they come tightly together under load, the pin connection is substantially relieved of shear loading.

In another aspect my invention comprises a three point connection between the adjacent ends of the sections of a form support, comprising a turnbuckle connection between the bottoms of the sections, a transverse pin connection between the tops of the sections, and a thrust bearing beween the tops of the sections, the thrust bearing being indexed to the pin connection to substantially free the pin connection from shear loading under full load conditions on the girder.

Description

In the drawings which illustrate the best mode contemplated by me of carrying out my invention:

Fig. 1 is a side elevational view of the mating ends of a pair of form supporting girder sections joined by my improved connecting means.

Fig. 2 is a transverse vertical sectional view taken on the line 2—2 of Fig. 1.

Fig. 3 is a top plan view with portions of the top walls of the girder sections broken away to reveal the elements of the connecting means.

Fig. 4 is a side elevational view of a fully assembled form supporting girder utilizing my improved connecting means, and illustrates the utilization of the invention as a form supporting girder, or carrier, under conditions where it is desired to adjust for a slight preliminary camber.

Fig. 5 is a view similar to Fig. 4 but illustrating the condition of the girder after it has been placed under load.

Fig. 6 is a further side elevational view of the same girder illustrating a step in removal of the girder after use.

Fig. 7 is a detail view of the connecting brackets fixed to the ends of an adjacent pair of girder sections, with connecting pin in place, the relative positions of the brackets and the pin representing their relationship under the cambering adjustment otherwise shown in Fig. 4, but with some exaggeration as to the degree of camber for better illustration of the interaction between the shear-type pin, connection and the butted joint of my combined shear and thrust bearing connection.

Fig. 8 is a view similar to Fig. 7 illustrating the relative positions of the parts after the girder has been loaded as in Fig. 5.

Fig. 9 is a further detail view of the mated connecting brackets illustrating the condition otherwise shown in Fig. 6.

It may be mentioned here that Figs. 7, 8 and 9 are properly to be regarded as being to a certain extent diagrammatic, with some exaggeration not only of the degree of change in the relative angular positions of the connecting brackets but also of the clearances between the connecting pin and the apertures in the brackets.

The assembled girder shown in Figs. 4, 5 and 6 comprises three intermediate sections 10, 11 and 12 which may be of the same length or of varying lengths, being selected and assembled according to the over-all length of girder needed for the particular application, and depending upon the distance between supports, or the span. The girder further comprises a pair of end sections 13 and 14 which may be of a type which includes adjustable supporting brackets 29 furnishing a means for obtaining a final adjustment in length, and which may be selected with reference to the design and construction of the walls, ledges, beams or other end supports for the girder. By way of example, I have illustrated a support at the left-hand end of these views which consists of the top of a wall section 15, whereas the support shown at the right-hand end consists of the lower flange of an I-beam 16. The particular design and construction of the intermediate sections 10, 11 and 12 and end sections 13 and 14 of the girder form no part of the present invention, and inasmuch as these elements have recently become well known in the art, have been described in printed publications in the United States and foreign countries, and are available on the market, detailed description appears unnecessary. However, with particular reference to the intermediate sections 10, 11 and 12, it may be stated that, as in the case of the girder sections described in the Hinze United States Patent No. 2,687,193, such sections may comprise upper chord members 17 and lower chord members 18 spaced therefrom, the upper and lower chord members being interconnected as by means of a series of struts 19 welded or otherwise fixed to the chord members. In the preferred construction shown, upper chord members 17 are formed of metal channel sections presenting upper load supporting surfaces 20 and downwardly extending lateral flanges 21 (Figs. 1–3). Further, in the construction selected for illustration, the lower chord members 18 are metal rods having bifurcated ends forming a clevis 22 with holes for connecting pins 23 for attachment of connecting means 24 spaced from the upper load supporting surfaces 20 of the girder sections. A preferred form of such connecting means comprises a turnbuckle 25 and a pair of left and right turnbuckle rods 26, 27 formed with eyes 28 received in clevis 22 and secured by connecting pins 23.

In accordance with my invention other connecting means, indicated generally at 30, are provided between adjacent pairs of girder sections as follows: the mating ends of adjacent sections, such as sections 10 and 11 shown in Fig. 1 (confer also Fig. 4), are formed with overlapping portions adjacent the upper load supporting surfaces 20, these overlapping portions 31, 31 and 32, 32 having aligned openings 33, 33 and 34, 34 respectively to receive a connecting pin 35 extending transversely to the length of the girder, and are further formed with transversely extending surfaces 36, 37 abutting for transmission of compressive stresses between the adjacent sections 10 and 11 forming a thrust bearing.

In my preferred construction connecting means 30 comprises a bracket 38 fixed to the end of the upper chord of one of the sections, this bracket presenting an end surface 37 substantially normal to the axis of such section and including a pair of ears 31, 31 comprised in the aforesaid overlapping portions. The openings 33 previously referred to are in line with the end surface 37. A complementary bracket 39 is fixed to the adjacent end of the upper chord of the adjacent section, this complementary bracket presenting an end surface 36 to abut the end surface 37 of the first bracket under load, and including a pair of ears 32, 32 comprised in the aforesaid overlapping portions and arranged to overlap the ears 31, 31 of the first bracket. Pin 35 inserted through the aligned openings of the overlapping ears serves to lock the two sections together for handling during placement of the girder. This condition is illustrated in Figs. 4 and 7.

When the girder is cambered as shown, the thrust bearing surfaces 36 and 37 may be separated slightly, this condition being illustrated with some exaggeration in Fig. 7. Setting of the camber is accomplished by adjusting the turnbuckles of the connecting means 24. This may be done either before or after the girder has been placed on the supports 15, 16. If done beforehand, connecting pins 35 will be placed in shear upon lifting the girder into place with the use of crane hooks or slings attached to the ends of the girder. However, this shear loading of pins 35 is of course negligible in handling the free unloaded girder.

After a series of girders have been placed as indicated in Fig. 4, form lumber may be put in place on the tops of the girders, or pre-cast concrete blocks may be placed in position spanning adjacent girders, depending upon the particular type of concrete construction which is to be employed. I have not attempted to distinguish between the various conventional types of concrete construction in Figs. 5 and 6 as the invention is equally applicable to reinforced concrete or pre-cast block floors, ceilings and arches. After the concrete floor material 40 is in place, and while the concrete is setting, the weight of this material produces a certain amount of deflection in the girders, this deflection having been determined properly in advance and the degree of camber set accordingly. The loaded condition of the girders will be as illustrated in Fig. 5 wherein the upper load supporting surfaces 20 of the girder sections are in exact alignment, and the thrust bearing surfaces 36 and 37 will have been brought tightly together in abutting relation as shown in Fig. 8. The effect of this arrangement is to eliminate or substantially reduce shear loading of the connecting pin and permit utilization of the full strength characteristics of the butted joint when the girder is in use under load. This result occurs automatically between the unloaded pre-cambered condition of Figs. 4 and 7, and the loaded no-camber condition of Figs. 5 and 8, without any special attention on the part of the workman because of the alignment between the thrust bearing surfaces 36, 37 with the openings for connecting pin 35. This alignment is clearly shown in Fig. 8 in which it will be seen that the thrust bearing 36, 37 between the tops of the sections is indexed to the pin connection to free the latter from shear loading under the full load conditions represented in this view. The effect of the transfer from shear loading to butt loading is strikingly demonstrated by the fact that in the first-named condition the connecting pin 35 is tightly held under the shear load, whereas in the last-named condition the pin becomes so loose that it can under most circumstances be removed easily with the fingers. This will be understood from a comparison of Figs. 7 and 8. For most purposes the clearance between the pin 35 and the openings 33, 34 need not be as great as shown in Figs. 7 and 8. Indeed it is even possible, when working to close tolerances, that the clearance will approach zero and still yield the advantages aforementioned.

Now let us consider the operation of my improved connection in removing the girder after the concrete has set. The first step recommended is to loosen one or more of the turnbuckles of the lower chord connecting means 24, 24. This permits the girder to sag into the position shown in Fig. 6. When the turnbuckles have been loosened, this can have the effect of placing the pins 35 under shear loading again, provided they have not first been removed. According to one procedure the pins may be left in place and the adjustable brackets 29, or one of them, be loosened and drawn back, as by means of a suitable tool 41, into the position indicated in dotted lines at 29' in Fig. 6, so that the girder can be lowered in one piece, and later re-used without having to reassemble any of its component parts. According to another procedure, it may be desired to remove one of the connecting pins 35, and this will have been done before loosening the turnbuckles and while the pin is free from shear loading. Then it is only necessary to disconnect completely that one of the turnbuckles 25 which is opposite the pin that has been removed, from one of the turnbuckle rods 26 or 27 to disconnect completely the adjacent sections. After that it is possible to remove the girder in two parts, each of which may comprise one or more end and intermediate sections. In this action the supporting ends of brackets 29 can be freed with relative ease by moving the parts from one side to the other.

While in Fig. 7 I have illustrated a condition of cambering in which the thrust bearings 36 and 37 are slightly separated, it is nevertheless possible, at least in cases of moderate camber, to have the ends of the adjacent sections abutting both before and after the load is applied, i.e. they can be tight together when set up for pouring the concrete as well as after the concrete has been poured. In this case the pins 35 will be free for removal under both the loaded and unloaded conditions. It is also possible to provide sufficient clearance between the pins 35 and the openings 33 and 34 (either with round or elongated openings), so that the sectional girders can be used either for flat ceilings as shown, or for arches, retaining the feature of abutting relationship of the surfaces 36 and 37 under load so that, as previously described, the connecting pins are substantially free from shear loading.

A further advantage of the structure which I have described lies in its capacity to accept shear loading without placing the connecting pins 35 under stress. This is due to conjoint action between the thrust bearing surfaces 36, 37, vertical tolerance or clearance between pins 35 and openings 33 and 34, and the construction of the connecting means 24 in the line of the lower chord of the girder. This may be explained as follows: With reference to Figs. 1 and 8, let us assume a condition in which vertical loading of section 11 tends to move it downwardly with respect to adjacent section 10. This action is resisted by friction between the thrust bearing surfaces 36 and 37, and under the assumed conditions it will be understood that some relative vertical movement will take place between the abutting ends of the upper chords 17 of the two girder sections, producing slight downward movement of surface 36 with respect to surface 37 of the connecting brackets 39 and 38. The result of this relative movement will be to produce, in turn, relative displacement between the pins 23 which form pivotal connections at the ends of the turnbuckle means. This in turn has the effect of producing a slight clockwise rotation of the turnbuckle connection. Such clockwise rotation increases the force with which surfaces 36, 37 are pressed together because it shortens the horizontal distance between the centers of the pivots 23. Thus the greater the force tending to produce relative vertical movement of the ends of the two sections under shear loading, the harder these ends will be drawn together to resist such movement. Consequently with my arrangement it is possible to meet severe shear loading conditions without imposition of shear stresses on the connecting pins in the upper chords. This means that the pins can be easily removed under such conditions as well as under the conditions previously described with reference to the normal action of the girder between the unloaded pre-cambered condition and the loaded no-camber condition.

A still further feature of the construction I have described is that the connecting pin arrangement maintains vertical and lateral alignment of the thrust bearing surfaces of the girder sections during erection, cambering, placement, and application of load.

What I have provided in effect is a three point connection between the adjacent ends of the sections of a form support comprising a turnbuckle or other connection between the bottoms of the sections, a transverse pin connection between the tops of the sections, and a thrust bearing between the tops of the sections, the thrust bearing being indexed to the pin connection to free the pin connection from shear loading under full load conditions on the girder when the stresses are taken by the forces of reaction set up by the thrust bearing and turnbuckle connection.

The terms and expressions which I have employed are used in a descriptive and not a limiting sense, and I have no intention of excluding such equivalents of the invention described, or of portions thereof, as fall within the purview of the claims.

I claim:
1. A girder comprising at least two sections connected together by a three point connection including a turnbuckle connection between the bottoms of the sections, the bottom of the girder formed by said sections and said turnbuckle connection being stretchable, a transverse pin connection between the tops of the sections including a pin and aligned openings in the top ends of said sections wherein said pin has a smaller diameter than the diameter of said openings, and a thrust bearing between the tops of the sections, the vertical plane passing through said thrust bearing being in vertical alignment with the longitudinal axis of said pin, whereby said sections may be slanted upwardly toward said three point connection when said sections are not loaded during which time the top ends of said sections are held together by said pin connection, the upward slant decreasing and the bottom of the girder stretching as the load on said ends is increased until said thrust bearing becomes operative, so as to free said pin connection from shear loading under full load conditions on the girder.

2. A camberable girder comprising at least two sections each having interconnected upper and lower chords, said two sections having a turnbuckle connection between their lower chords and a transverse connecting pin connection between their upper chords including a connecting pin and aligned openings in the ends of the upper chords of the adjacent sections wherein said pin has a diameter smaller than the diameter of said openings, the bottom of the girder formed by said lower chords and turnbuckle connection being stretchable, and complementary transverse surfaces at the ends of the upper chords, whereby said sections may be slanted upwardly toward said transverse connecting pin connection when said upper chords are not loaded at which time the upper chords are held together by said connecting pin, the upward slant decreasing and the bottom of the girder stretching as the load on said upper chords is increased until said transverse surfaces abut under load to relieve said pin connection of shear loading.

References Cited in the file of this patent
UNITED STATES PATENTS

| | | |
|---|---|---|
| 732,164 | Burdon | June 30, 1903 |
| 1,112,542 | Loser | Oct. 6, 1914 |
| 1,163,641 | Cummings | Dec. 14, 1915 |
| 1,987,769 | Bittorf | Jan. 15, 1935 |
| 2,687,193 | Hinze | Aug. 24, 1954 |
| 2,793,720 | Hawes | May 28, 1957 |